US 9,514,043 B1

(12) United States Patent
Patel

(10) Patent No.: US 9,514,043 B1
(45) Date of Patent: Dec. 6, 2016

(54) SYSTEMS AND METHODS FOR UTILIZING WEAR LEVELING WINDOWS WITH NON-VOLATILE MEMORY SYSTEMS

(71) Applicant: SanDisk Technologies Inc., Plano, TX (US)

(72) Inventor: Leena Patel, Edinburgh (GB)

(73) Assignee: SanDisk Technologies LLC, Plano, TX (US)

( * ) Notice: Subject to any disclaimer, the term of this patent is extended or adjusted under 35 U.S.C. 154(b) by 101 days.

(21) Appl. No.: 14/710,135

(22) Filed: May 12, 2015

(51) Int. Cl.
*G06F 12/00* (2006.01)
*G06F 12/02* (2006.01)

(52) U.S. Cl.
CPC ... *G06F 12/0246* (2013.01); *G06F 2212/7201* (2013.01); *G06F 2212/7211* (2013.01)

(58) Field of Classification Search
CPC .................. G06F 12/0246; G06F 2212/7211; G06F 2212/7201
See application file for complete search history.

(56) References Cited

U.S. PATENT DOCUMENTS

| | | | | |
|---|---|---|---|---|
| 2010/0100663 | A1* | 4/2010 | Kao | G06F 12/0246 711/103 |
| 2010/0318719 | A1* | 12/2010 | Keays | G06F 12/0246 711/103 |
| 2010/0325340 | A1* | 12/2010 | Feldman | G06F 12/0246 711/103 |
| 2010/0332201 | A1* | 12/2010 | Albarede | H01J 37/32935 703/2 |
| 2014/0351493 | A1* | 11/2014 | Iaculo | G11C 16/349 711/103 |

* cited by examiner

*Primary Examiner* — John A Lane
(74) *Attorney, Agent, or Firm* — Brinks Gilson & Lione

(57) ABSTRACT

Systems and methods for utilizing wear leveling windows with non-volatile memory systems are disclosed. In one implementation, a memory management module of a non-volatile memory system compares a metric reflecting wear of a memory block to a wear leveling window and determines whether a wear leveling indicator associated with the memory block restricts performing a wear leveling operation on the memory block. The memory management module performs a wear leveling operation on the memory block in response to determining that the metric reflecting wear of the memory block falls outside the wear leveling window and determining that the wear leveling indicator does not restrict performing a wear leveling operation on the memory block. After performing the wear leveling operation, the memory management module places the memory block on a free block list.

23 Claims, 10 Drawing Sheets

US 9,514,043 B1

SYSTEMS AND METHODS FOR UTILIZING WEAR LEVELING WINDOWS WITH NON-VOLATILE MEMORY SYSTEMS

BACKGROUND

Conventional non-volatile memory systems often utilize wear leveling techniques to move data from memory blocks that are infrequently updated to memory blocks that are frequently updated. These wear leveling techniques are often based on averages of program/erase cycle counts (P/E count) of the memory blocks within a memory system. In conventional wear leveling techniques, memory systems may attempt to maintain a P/E count of each memory block near an overall average P/E count of the memory blocks at the memory system. This effort to maintain the P/E count of each memory block near the overall average P/E count of the memory system may lead to unnecessary write operations that result in unnecessarily copying of data from one memory block to another.

Improved wear leveling techniques are desirable that reduce a number of write/copy operations within a non-volatile memory system.

DETAILED DESCRIPTION OF THE DRAWINGS

Figure 1A:
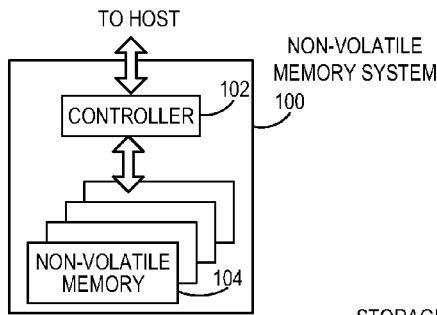
FIG. 1A is a block diagram of an example non-volatile memory system.

The present disclosure is directed to systems and methods for utilizing wear leveling windows in non-volatile memory systems. Generally, a memory management module of a non-volatile memory system utilizes a wear leveling window to identify memory blocks for wear leveling. The wear leveling window defines a ceiling limit and a floor limit that are based on metrics such as a program/erase cycle count (P/E count) of a memory unit such as a memory block; an age of a memory unit; a longevity or capability of a memory unit; and/or any other metric which provides information about a relative wear of one memory unit when compared to another memory unit.

As discussed in more detail below, when a P/E count associated with a memory block, for example, falls outside the ceiling limit or the floor limit of the wear leveling window, the memory management module identifies the memory block for wear leveling. The memory management module copies data from the memory block to another memory block, places the identified memory block on a free block list, and adjusts a wear leveling indicator for the memory block that restricts the memory management module from performing a future wear leveling operation on the memory block.

Periodically, the memory management module adjusts the ceiling limit and/or the floor limit of the wear leveling window. The memory management module may adjust the ceiling limit and/or the floor limit to slide the wear leveling window as the overall average P/E count of the memory blocks within the non-volatile memory system increase with the age of the memory system. Additionally, the memory management module may adjust the ceiling limit and/or the floor limit to narrow or widen the wear leveling window based on conditions within the memory system.

In one embodiment, a method is disclosed. The elements of the method occur in a memory management module of a non-volatile memory system that comprises a plurality of memory blocks. The memory management module compares a P/E count associated with a memory block of the non-volatile memory system to a wear leveling window that comprises a ceiling limit and a floor limit and determines whether a wear leveling indicator associated with the memory block restricts performing a wear leveling operation on the memory block.

The memory management module performs a wear leveling operation on the memory block in response to determining that the program/erase cycle count associated with the memory block is within a defined range of one of the ceiling limit or the floor limit of the wear leveling window and determining that the wear leveling indicator associated with the memory block does not restrict performing a wear leveling operation on the memory block. The memory management module then places the memory block on a free block list.

In another embodiment, a non-volatile memory system is disclosed. The non-volatile memory system comprises a non-volatile memory and processing circuitry in communication with the non-volatile memory. The non-volatile memory comprises a plurality of memory units.

The processing circuitry comprises a memory management module that is configured to compare a program/erase cycle count associated with a memory unit to a ceiling limit and a floor limit; to perform a wear leveling operation on the memory unit based on the comparison of the program/erase cycle count associated with the memory unit and the ceiling limit and the floor limit; to place the memory unit on a free memory unit list after performing the wear leveling operation on the memory unit; and to adjust at least one of the ceiling limit or the floor limit.

In yet another embodiment, another method is disclosed. The elements of the method occur in a memory management module of a non-volatile memory system that comprises a plurality of memory units. The memory management module determines that a metric reflecting wear of a memory unit falls outside of a wear leveling window. The memory management unit then performs a wear leveling operation on the memory unit and adjusts a wear leveling indicator associated with the memory unit to restrict the memory management module from performing a future wear leveling operation on the memory unit.

In some implementations, the wear leveling indicator may be stored in a header file of the memory unit or in a look-up table stored at the non-volatile memory system.

In some implementations, the wear leveling indictor may comprise a flag and adjusting the wear leveling indicator may include the memory management module setting the flag to a state that indicates to the memory management module that the memory unit is not a good candidate for wear leveling.

Similarly, in some implementations, the wear leveling indicator may comprise a counter and adjusting the wear leveling indicator may include the memory management module setting a value of the counter such that the resulting value of the counter indicates to the memory management module that the memory unit is not a good candidate for wear leveling.

Other embodiments and implementations are possible, and each of the embodiments can be used alone or together in combination. Accordingly, various embodiments and implementations will be described with reference to the attached drawings.

Figure 1B:
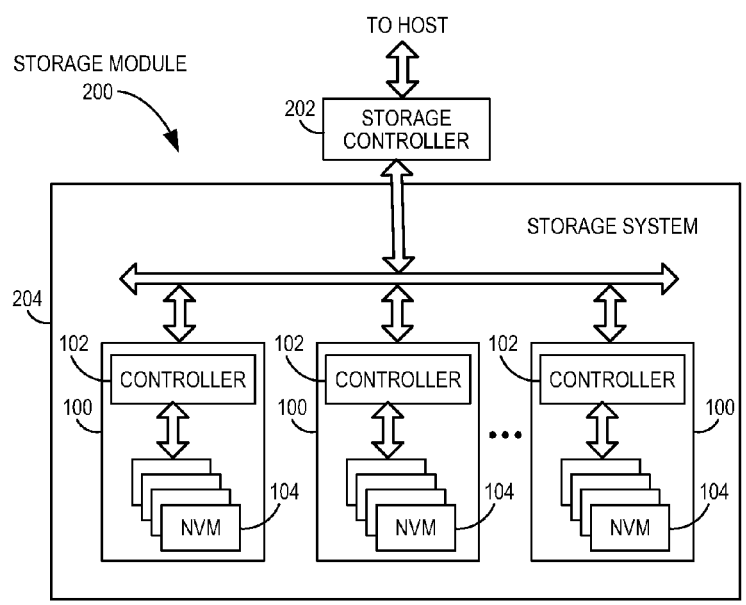
FIG. 1B is a block diagram illustrating an exemplary storage module.
Figure 1C:
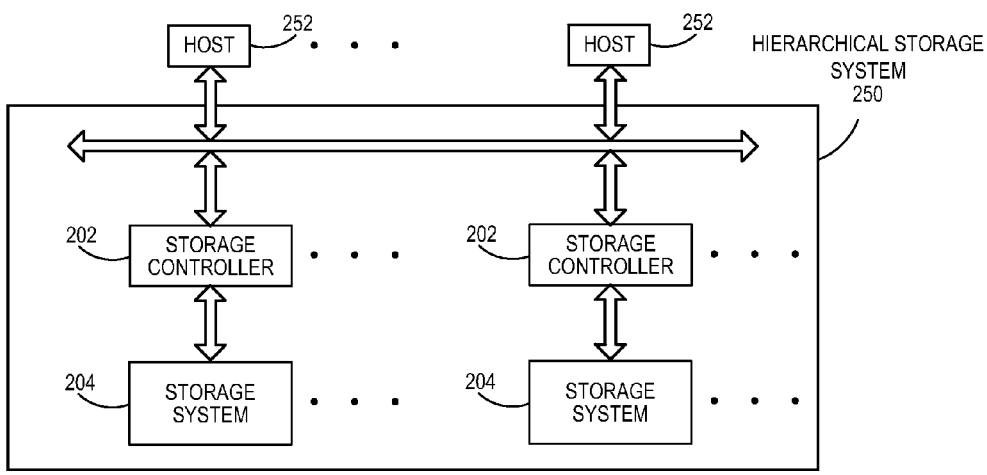
FIG. 1C is a block diagram illustrating a hierarchical storage system.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 includes a single channel between controller 102 and non-volatile memory die 104, the subject matter described herein is not limited to having a single memory channel. For example, in some NAND memory system architectures, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
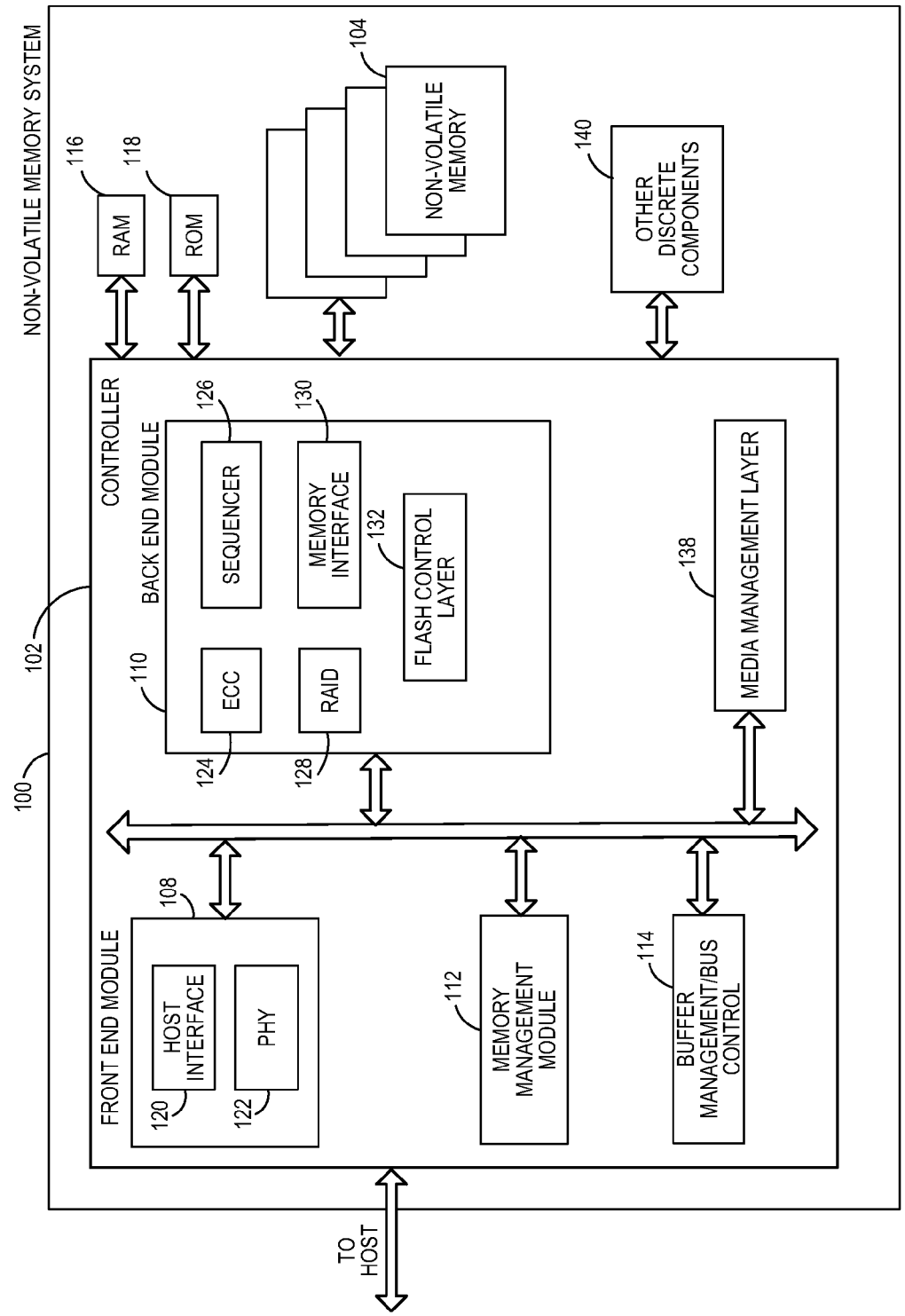
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a memory management module 112 that are present on the same die as the controller 102. As explained in more detail below in conjunction with FIGS. 5-7d, the memory management module 112 may perform operations that utilize a wear leveling window to identify memory blocks for wear leveling. The memory management module 112 additionally periodically adjusts the wear leveling window based on conditions within the memory system.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a dual data rate (DDR) interface, such as a Toggle Mode 200, 400, or 800 interface. A flash control layer 132 controls the overall operation of back end module 110.

Additional components of system 100 illustrated in FIG. 2A include media management layer 138, which operates in conjunction with the memory management module 112 to perform wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
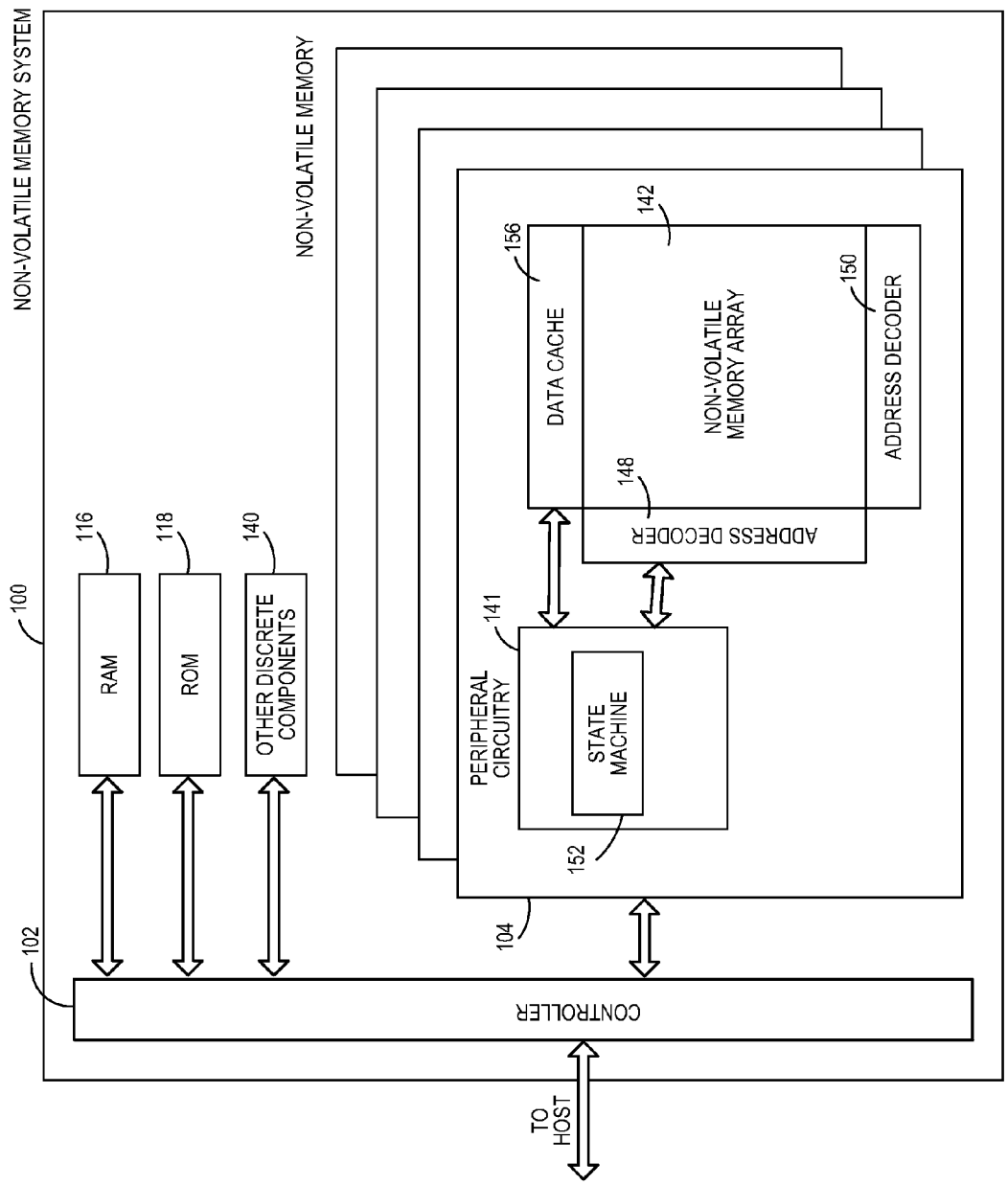
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
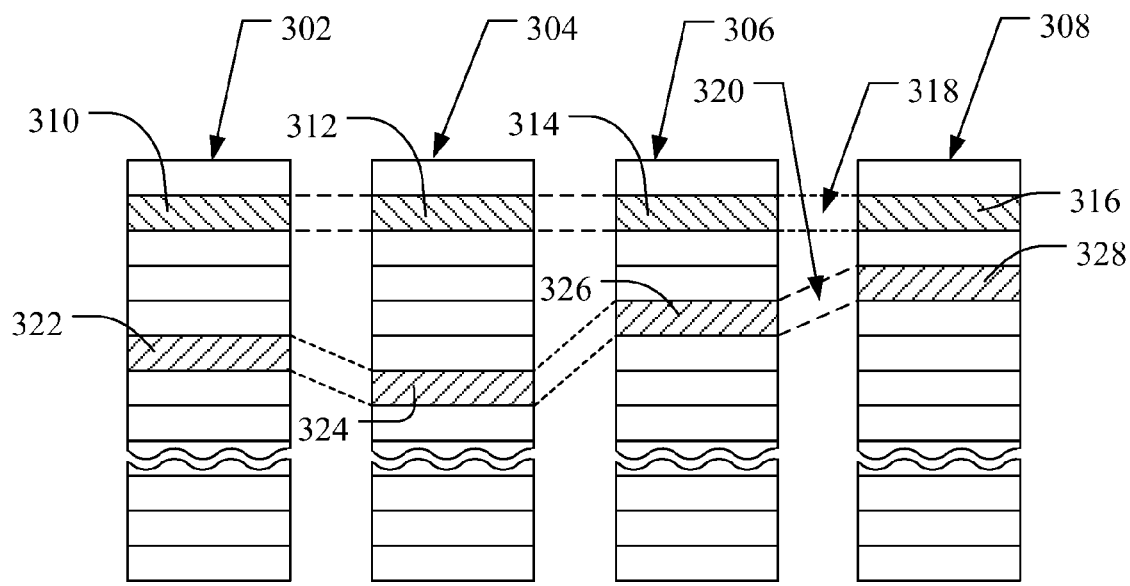
FIG. 3 illustrates an example physical memory organization of a memory bank.

FIG. 3 conceptually illustrates a multiple plane arrangement showing four planes 302-308 of memory cells. These planes 302-308 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 3 by rectangles, such as blocks 310, 312, 314 and 316, located in respective planes 302-308. There can be dozens or hundreds or thousands or more of blocks in each plane.

As mentioned above, a block of memory cells is the unit of erase, the smallest number of memory cells that are physically erasable together. Some non-volatile memory systems, for increased parallelism, operate the blocks in larger metablock units. However, other memory systems may utilize asynchronous memory die formations rather than operating in larger metablock units.

In non-volatile memory systems utilizing metablock units, one block from each plane is logically linked together to form the metablock. The four blocks 310-316 are shown to form one metablock 318. All of the cells within a metablock are typically erased together. The blocks used to form a metablock need not be restricted to the same relative locations within their respective planes, as is shown in a second metablock 320 made up of blocks 322-328. Although it is usually preferable to extend the metablocks across all of the planes, for high system performance, the non-volatile memory systems can be operated with the ability to dynamically form metablocks of any or all of one, two or three blocks in different planes. This allows the size of the metablock to be more closely matched with the amount of data available for storage in one programming operation.

Figure 4:
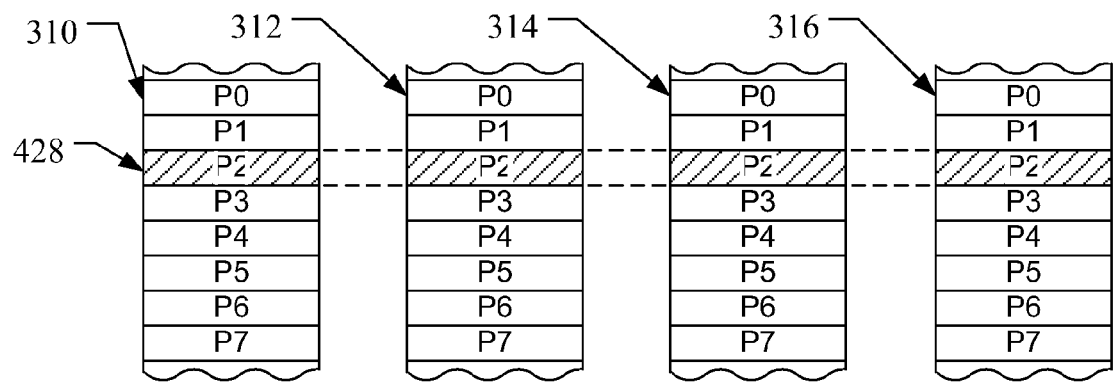
FIG. 4 shows an expanded view of a portion of the physical memory of FIG. 3.

The individual blocks are in turn divided for operational purposes into pages of memory cells, as illustrated in FIG. 4. The memory cells of each of the blocks 310-316, for example, are each divided into eight pages P0-P7. Alternatively, there may be 16, 32, 64 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 428 is illustrated in FIG. 4, being formed of one physical page from each of the four blocks 310-316. The metapage 428, for example, includes the page P2 in each of the four blocks but the pages of a metapage need not necessarily have the same relative position within each of the blocks.

As mentioned above, non-volatile memory systems described in the present application utilize a wear leveling window defining a P/E count ceiling limit and a P/E count floor limit to identify memory blocks within the memory system for wear leveling. In some implementations the ceiling limit or the floor limit may be a single P/E count threshold value, wherein in other implementations, the ceiling limit or the floor limit may be a range of P/E count values.

In other implementations, the wear leveling window may be defined in terms of metrics other than P/E cycles. For example, a wear leveling window may define a ceiling limit and/or a floor limit in terms of a metric reflecting an age of a memory unit such as a memory block; a metric reflecting a longevity or capability of a memory unit such as a memory block; and/or any other metric which provides information about a relative wear of one memory unit when compared to another memory unit.

Continuing with an example where the wear leveling window is defined in terms of P/E counts, a memory management module of a non-volatile memory system monitors a P/E count associated with one or more memory units such as memory blocks of a non-volatile memory of the memory system. The memory management module periodically compares P/E counts associated with the memory blocks to a wear leveling window to identify memory blocks to perform wear leveling operations on.

When the memory management module determines that a P/E count associated with a memory block falls outside the ceiling limit or the floor limit of the wear leveling window, the memory management module performs a wear leveling operation to copy data from the identified memory block to another memory block and place the identified memory block on a free block list. Generally, a P/E count of a memory block may fall outside of the ceiling limit or the floor limit of the wear leveling window when a P/E count associated with the memory block is at or within a defined distance of the ceiling limit or the floor limit of the wear leveling window.

A free block list is generally a listing that the memory management module or another module of a controller of the memory system maintains that includes memory blocks within the memory system that do not contain valid data and are available to store data. In some implementations, the free block list is part of a Group Address Table maintained within the memory system that maps logical block addresses to physical block addresses.

In some implementations, the free block list is ranked in terms of a P/E count associated with a memory block. For example, a memory block at a beginning of the list, also known as a head of the list, is associated with a lowest P/E count and a memory block at an end of the list, also known as a tail of list, is associated with a highest P/E count, or vice versa.

As described in more detail below, the memory management module may set a flag, a counter, or some other type of wear leveling indicator that indicates whether or not a memory block is an ideal candidate for wear leveling. For example, the memory management module may set a wear leveling flag to an "on" state to signify that the memory management module should not perform a wear leveling operation on the memory block or set a wear leveling flag to an "off" state to signify that the memory management module is free to perform a wear leveling operation on the memory block.

In another example, the memory management module may set and/or decrement a wear leveling counter whose value signifies to the memory management module whether or not the memory management module should perform a wear leveling operation on the memory block. In one implementation, the memory management module initially sets a wear leveling counter associated with a memory block to zero to indicate to the memory management module that it is not prohibited from performing wear leveling on the memory block. When a P/E count of the memory block falls outside of the wear leveling window and the block is selected for wear leveling, the memory management module sets the wear leveling counter to a maximum value that is greater than zero to indicate to the memory management module that the memory block is not a good candidate for wear leveling. In one implementation the maximum value of the wear leveling counter may be 10.

Each time the memory management module adjusts the wear leveling window, as discussed below, and the P/E count of the memory block remains outside the wear leveling window, the memory management module may decrement the value of the wear leveling counter. By decrementing the wear leveling counter, the memory management module ensures that the memory management module is not permanently prohibited from performing a wear leveling operation on the memory block.

Alternatively, the memory management module may set the value of the wear leveling counter for the memory block to zero when the memory management module adjusts the wear leveling window and the P/E count of the memory block no longer falls outside of the wear leveling window.

Each subsequent time the memory management module selects the memory block for wear leveling, the memory management may set the wear leveling counter to the maximum value that is greater than zero.

While the implementations described in the present application utilize a wear leveling counter for a memory block that is periodically set to a maximum value that is greater than zero when performing wear leveling on the memory block and then decremented as the wear leveling window is adjusted, it will be appreciated that other implementations of wear leveling counters may be utilized. For example, a wear leveling counter of a memory block may periodically be set to zero when performing wear leveling on the memory block and the memory management module may increment the value of the wear leveling counter as the wear leveling window is adjusted.

As mentioned, the memory management module periodically adjusts the wear leveling window. This may include increasing both the ceiling limit and the floor limit of the wear leveling window as the overall average P/E count of the memory blocks at a non-volatile memory system increases with use, for example. Adjusting the wear leveling window may also include adjusting a distance between the ceiling limit and the floor limit in order to expand or decrease a size of the wear leveling window. For example, in early life stages of the memory system, the memory system may maintain a wide distance between the ceiling limit and the floor limit of the wear leveling window. It will be appreciated that a wide wear leveling window provides a large spread of P/E counts for the memory blocks of the memory system and results in fewer wear leveling operations.

However, as the age of the non-volatile memory progresses, the memory management module may reduce the width of the wear leveling window and narrow the distance between the ceiling limit and the floor limit of the wear leveling window. It will be appreciated that a narrow wear leveling window provides a low spread of P/E counts for the memory block of the memory system and results in an increase in wear leveling operations.

Figure 5:
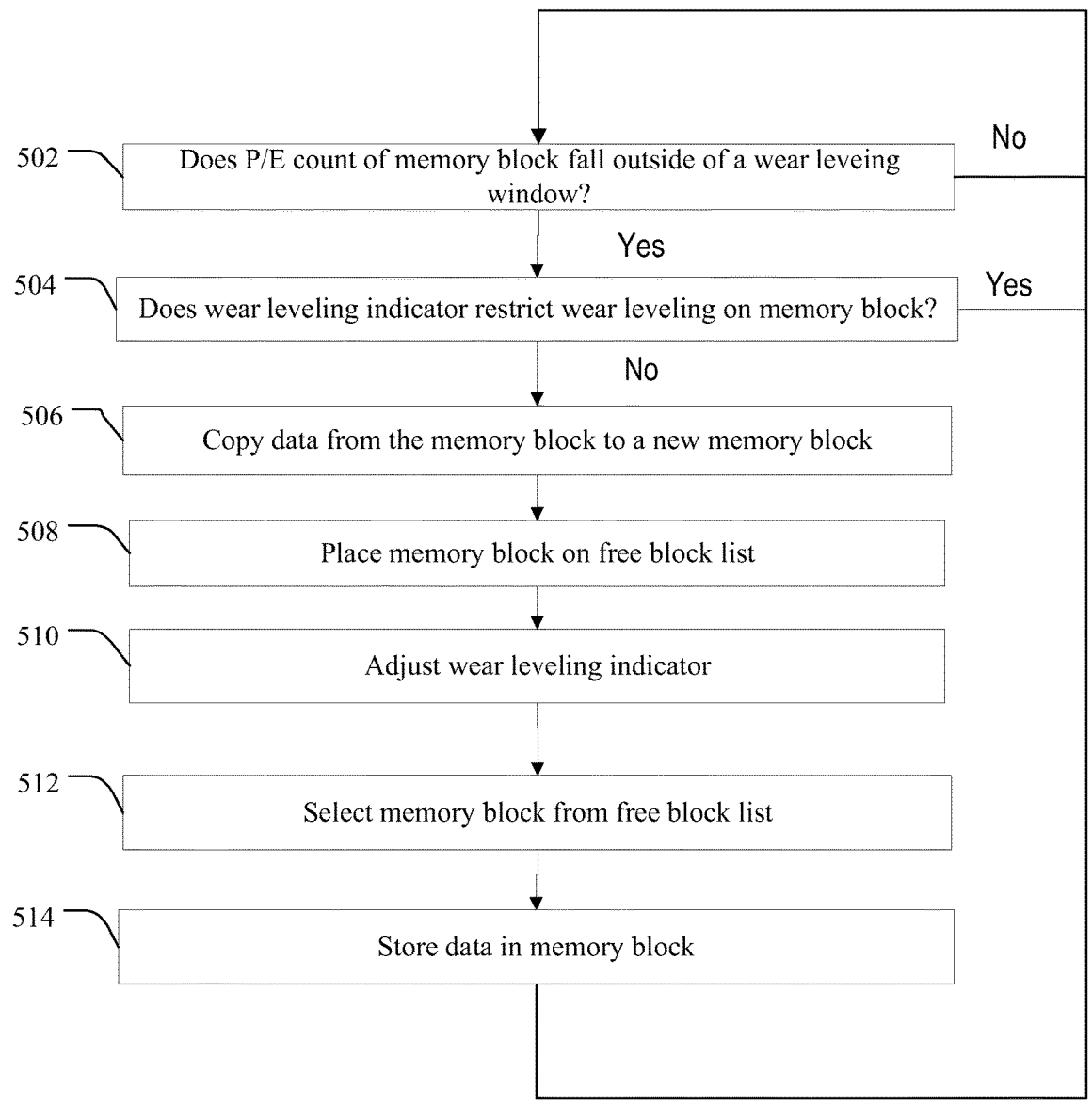
FIG. 5 is a flow chart of a method for utilizing a wear leveling window to identify a memory block for wear leveling and for performing wear leveling on the identified memory block.

FIG. 5 is a flow chart of a method for utilizing a wear leveling window to identify a memory block for wear leveling and for performing wear leveling on the identified memory block. While the method below is described in terms of a memory block, it will be appreciated that other implementations may utilize a memory unit other than a memory block. Similarly, while the method below is described in terms of a P/E count associated with a memory block, it will be appreciated that other implementations may utilize other wear metrics that reflect a longevity, capability, and/or relative wear of one memory unit when compared to another memory unit.

At step 502, a memory management module of a non-volatile memory system monitors a P/E count of a memory block and compares the P/E count of the memory block to a ceiling limit and a floor limit of a wear leveling window to determine whether the P/E count of the memory block falls outside of the wear leveling window.

When the memory management module determines that the P/E count is within the wear leveling window, the memory management module continues to monitor the P/E count of the memory block and repeats step 502. In some implementations, the memory management modules determines that the P/E count is within the wear leveling window when the memory management module determines that the P/E count of the memory block is not at or within a defined distance of the ceiling limit and the P/E count of the memory block is not at or within a defined distance the floor limit.

However, when the memory management module determines that the P/E count of the memory block falls outside of the wear leveling window, the memory management module proceeds to examine a wear leveling indicator associated with the memory block. In some implementations, the memory management module determines that the P/E count falls outside of the wear leveling window with the P/E count of the memory block is at or within a defined distance of the ceiling limit or the P/E count of the memory block is at or within a defined distance the floor limit of the wear leveling window.

At step 504, the memory management module examines a wear leveling indicator associated with the memory block. The wear leveling indicator may be a wear leveling flag or a wear leveling counter, for example, that informs a memory management module whether or not the memory management module is restricted from performing a wear leveling operation on the memory block.

When the memory management module determines at step 504 that the wear leveling indicator indicates that wear leveling on the memory block is restricted, the method loops to step 502 and the procedure is repeated. In implementations utilizing a wear leveling flag, a wear leveling flag set to an "on" position may signify to the memory management module that the memory block is not a good candidate for wear leveling. In implementations utilizing a wear leveling counter, a wear leveling counter whose value is greater than zero signifies to the memory management module that the memory block is not a good candidate for wear leveling.

Alternatively, when the memory management module determines at step 504 that the wear leveling indicator indicates that wear leveling on the memory block is not restricted, at step 506 the memory management module copies data from the memory block into a new memory block obtained from a free block list.

At step 508, the memory management module places the memory block on the free block list, and at step 510, the memory management module adjusts the wear leveling indicator associated with the memory block. When the wear leveling indicator is a wear leveling flag, adjusting the wear leveling indicator at step 510 may including changing the status of the wear leveling flag to an "on" state to signify that the memory management module should not perform a wear leveling operation on the memory block. Alternatively, when the wear leveling indicator is a wear leveling counter, adjusting the wear leveling indicator at step 510 may include setting the wear leveling counter to its maximum value to signify that the memory management module should not perform a wear leveling operation on the memory block.

As discussed in more detail below in conjunction with FIG. 6, the memory management module may later adjust the wear leveling indicator for the memory block to again allow wear leveling on the memory block when the memory management module adjusts the ceiling and/or floor limit of the wear leveling window and the P/E count of the memory block is no longer at or within a defined distance of the ceiling limit or the floor limit of the adjusted wear leveling window.

Subsequently during operation of the memory system, at step 512 the memory management module selects the memory block placed on the free block list at step 508 for the storage of data. In some implementations, the memory management module may select the memory block for the storage of data when the controller needs to open a new memory block for the storage of data and the memory block has a lowest P/E count of any memory block on the free block list.

In other implementations, the memory management module may select the memory block for the storage of data based on a P/E count associated with the memory block and a frequency with which the data to be stored in the memory block will be updated (also known as the temperature of the data).

For example, in order to avoid unnecessary wear leveling operations, when possible, the memory management module may store data that is frequently updated (also known as hot data) in a memory block associated with a low relative P/E count. It will be appreciated that storing hot data in a memory block with a relative low P/E count will allow the P/E count of the memory block to increase relative to other memory blocks as the memory management module updates the hot data.

Similarly, when possible, the memory management module stores data that is not frequently updated (also known as cold data) in a memory block associated with a high relative P/E count. It will be appreciated that storing cold data in a memory block with a relative high P/E count will allow the P/E count of the memory block to increase slowly relative to the other memory blocks that store data that the memory management module updates more frequently.

Examples of non-volatile memory systems that are configured to select a memory block from a free block list for the storage of data based on a frequency with which the data is updated are disclosed in U.S. patent application Ser. No. 14/584,388, filed Dec. 29, 2014.

At step 514, the memory management module stores the data at the memory block. It will be appreciated that after storing the data to the memory block, the memory management module monitors the memory block and repeats the above-described process beginning at step 502.

As mentioned above, the memory management module periodically adjusts the ceiling limit and/or the floor limit of the wear leveling window. The memory management module may adjust the ceiling limit and/or the floor limit to slide the wear leveling window as the overall average P/E count of the memory blocks within the memory system increases. Additionally, the memory management module may adjust the ceiling limit and/or the floor limit to narrow or widen the wear leveling window based on conditions within the non-volatile memory system.

Figure 6:
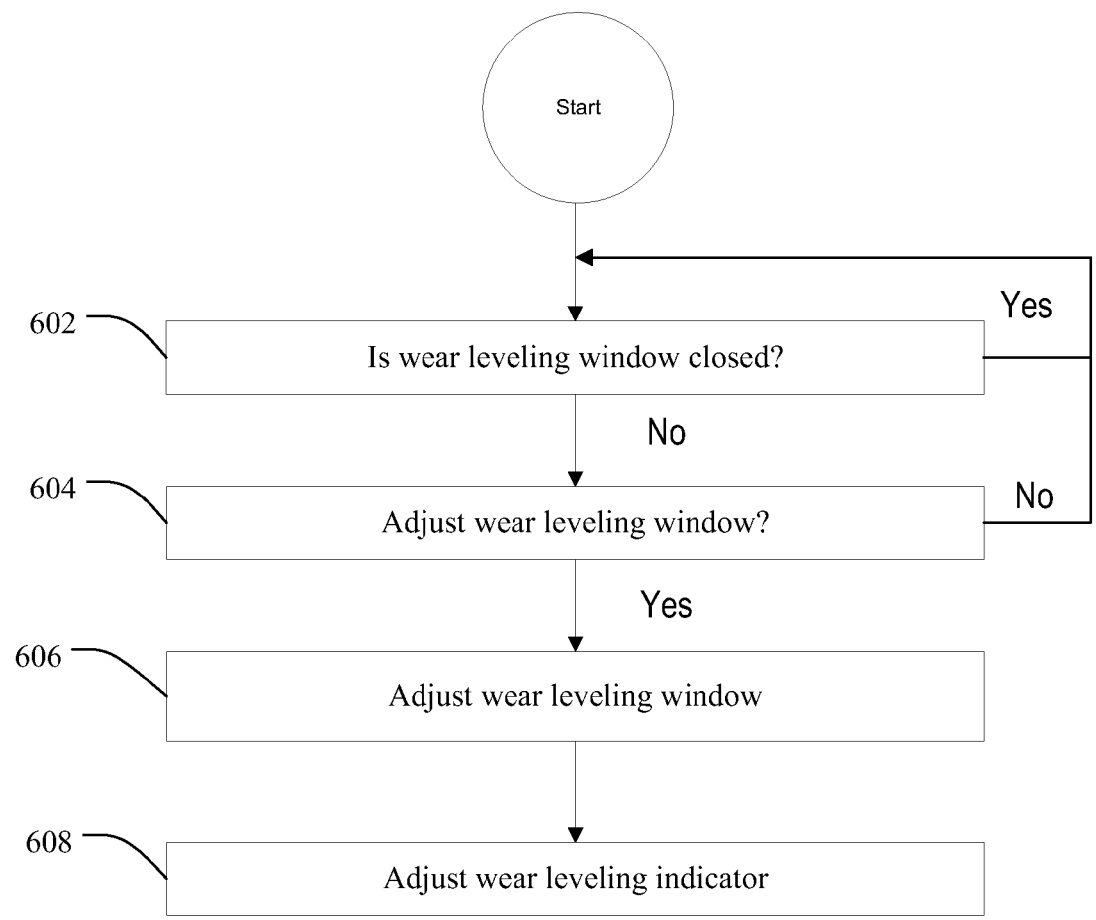
FIG. 6 is a flow chart of one implementation of a method for adjusting a wear leveling window.

FIG. 6 is a flow chart of one implementation of a method for adjusting a wear leveling window. At step 602, a memory management module of a non-volatile memory system determines whether a wear leveling window is in a closed state.

In some implementations, a wear leveling window is considered closed when the ceiling limit and the floor limit of the wear leveling window have reached a P/E count value which is equal to, or within a defined range of, a mean P/E count of the memory blocks of the non-volatile memory system. When the wear leveling window is consider closed, the memory management module should not adjust the wear leveling window until the mean P/E count of the memory blocks of the non-volatile memory system changes.

A wear leveling window may also reach a closed state when the ceiling limit and the floor limit should not be adjusted further due to some other limitation within the non-volatile memory system, such as when the ceiling limit is equal to a maximum possible P/E count of the memory system or when the ceiling limit is within a predefined margin of the floor limit of the wear leveling window.

When the memory management module determines that the wear leveling window is in a closed state, the memory management module does not adjust the wear leveling window and periodically repeats step 602 to determine whether or not the wear leveling window is in a closed state. Alternatively, when the memory management module determines that the wear leveling window is not in a closed state, also known as an open state, the memory management module proceeds to determine whether to adjust the wear leveling.

At step 604, the memory management module determines whether to adjust a wear leveling window. The memory management module may determine whether to adjust the wear leveling window based on factors such as a rate at which a memory block approaches one of a ceiling limit or a floor limit of the wear leveling window; a distance between the ceiling limit and the floor limit of the wear leveling window in relation to a spread of P/E counts associated with memory blocks at the non-volatile memory system; a number of wear leveling operations since the memory management module last adjusted the wear leveling window; a number of memory blocks on the free block list; a life stage of the non-volatile memory system; when the non-volatile memory system identifies a specific host access pattern; a spread of P/E counts relative to an average P/E count of the memory blocks at the non-volatile memory system; and/or any other factor that may indicate to a memory management module of a non-volatile memory system that the timing is appropriate to adjust the wear leveling window.

For example, when a rate at which a memory block approaches one of a ceiling limit or a floor limit of the wear leveling window changes, the memory management module may determine to modify the wear leveling window more or less often to reflect the new rate. When memory blocks within the memory system change from slowly approaching a ceiling limit or a floor limit to quickly approaching the ceiling limit or the floor limit as a result of memory blocks being cycled within the non-volatile memory system more quickly, the memory management module may adjust the ceiling limit and/or the floor limit more frequently.

Similarly, when memory blocks within the memory system change from quickly approaching a ceiling limit or a floor limit to slowly approaching the ceiling limit or the floor limit, for example as a result of memory blocks being cycled within the non-volatile memory system less often, the memory management module may adjust the ceiling limit and/or the floor limit less frequently.

In another example, the memory management module may adjust a distance between the ceiling limit and the floor limit of the wear leveling window to complement a spread of P/E counts associated with memory blocks at the non-volatile memory system. For example, the memory management module may desire an increased number of memory blocks available to store data that is frequently updated. Therefore, the memory management module adjusts the wear-leveling window such that a new floor of the wear-leveling window results in an increased number of memory blocks with P/E counts at or near the floor limit of the wear leveling window and available for wear leveling.

In a further example, the memory management module may adjust the wear leveling window after a defined number of operations at the memory system. The defined number of operations may vary over a life of the non-volatile memory system dependent on one or more characteristics of the memory system.

With respect to a life stage of the non-volatile memory system, the memory management module may update the wear leveling window differently at different stages of life of the memory system. For example, the memory system may adjust the wear leveling window to have a wide distance between the floor and the ceiling of the wear leveling window early in the life of the memory system, and adjust the wear leveling window to have a narrow distance between the floor and the ceiling of the wear leveling window towards an end in the file of the memory system.

For specific host access patterns, when the memory management module identifies a specific host access pattern to a specific range of memory, the memory management module may determine that these particular memory units will cycle faster. To accommodate this, the memory management module may increase the ceiling limit of the wear leveling window to control the number of resulting wear leveling operations.

With respect to a spread of P/E counts relative to an average P/E count of the memory blocks at the non-volatile memory system, the memory management module may set the floor and/or ceiling of the wear leveling window such that they closely follow a margin around the average P/E count.

When the memory management module determines at step 604 not to adjust the wear leveling window, the memory management module periodically repeats the above-described process beginning with determining whether the wear leveling window is in a closed state at step 602.

However, when the memory management module determines at step 604 to adjust the wear leveling window, the memory management module adjusts the ceiling limit, the floor limit, or both, at step 606 based on the factors described above.

Figure 7A:
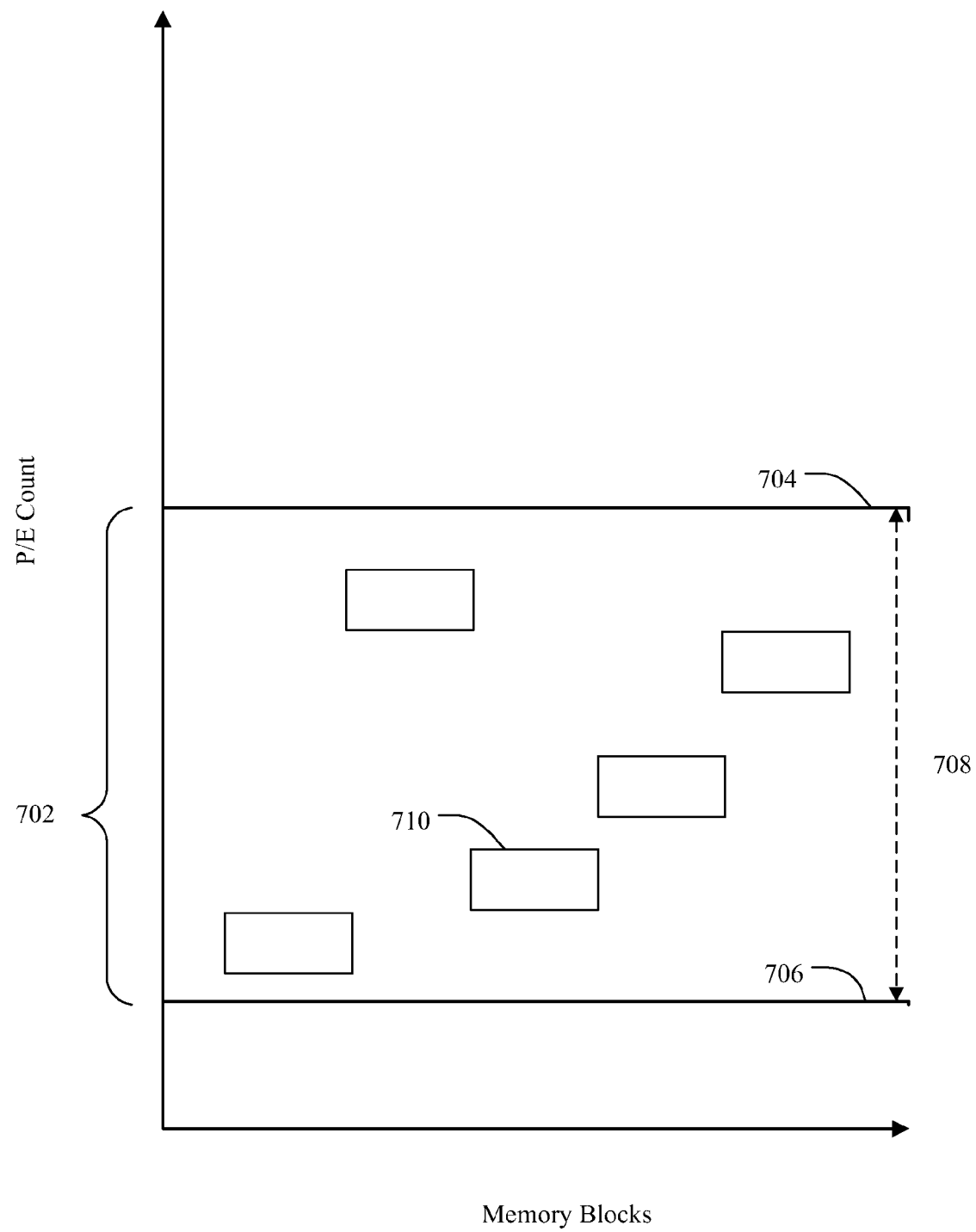
FIGS. 7a, 7b, 7c, and 7d conceptually illustrate a wear leveling window at different stages over a course of a life of a non-volatile memory system.

For a better understanding, FIGS. 7a, 7b, 7c, and 7d conceptually illustrate a wear leveling window at different stages over a course of a life of a non-volatile memory system. FIG. 7a shows a wear leveling window 702 defined by a ceiling limit 704 and a floor limit 706. A distance 708 separates the ceiling limit 704 and the floor limit 706. Memory blocks 710 of a non-volatile memory system are generally shown with P/E counts that are between the ceiling limit 704 and the floor limit 706.

Figure 7B:
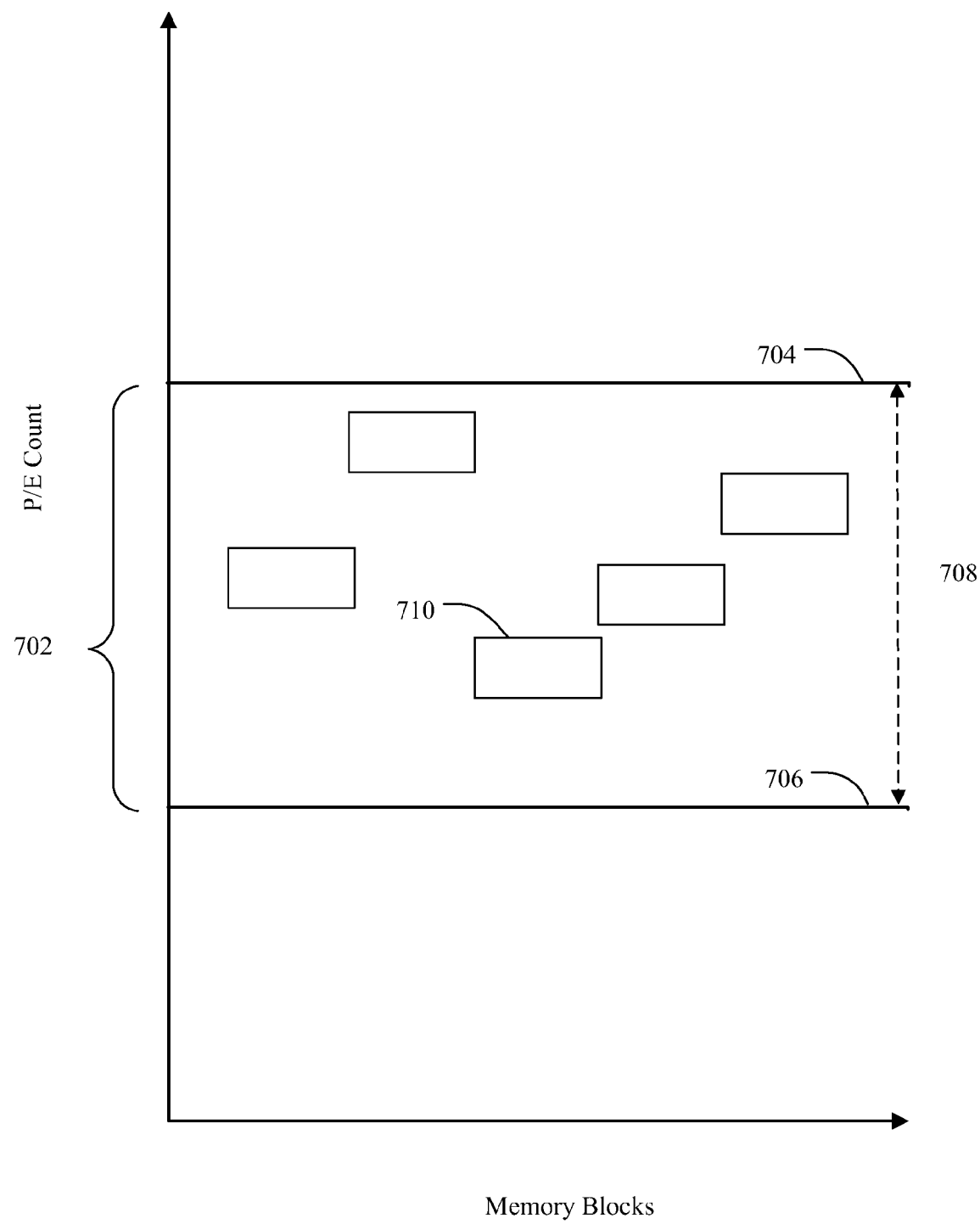

FIG. 7b illustrates a wear leveling window 702 after an adjustment. When compared to the wear leveling window 702 illustrated in FIG. 7a, it will be appreciated that the P/E count of both the ceiling limit 704 and the floor limit 706 are increased. Additionally, the distance 708 between the ceiling limit 704 and the floor limit 706 decreases in comparison to the wear leveling window 702 illustrated in FIG. 7a.

Figure 7C:
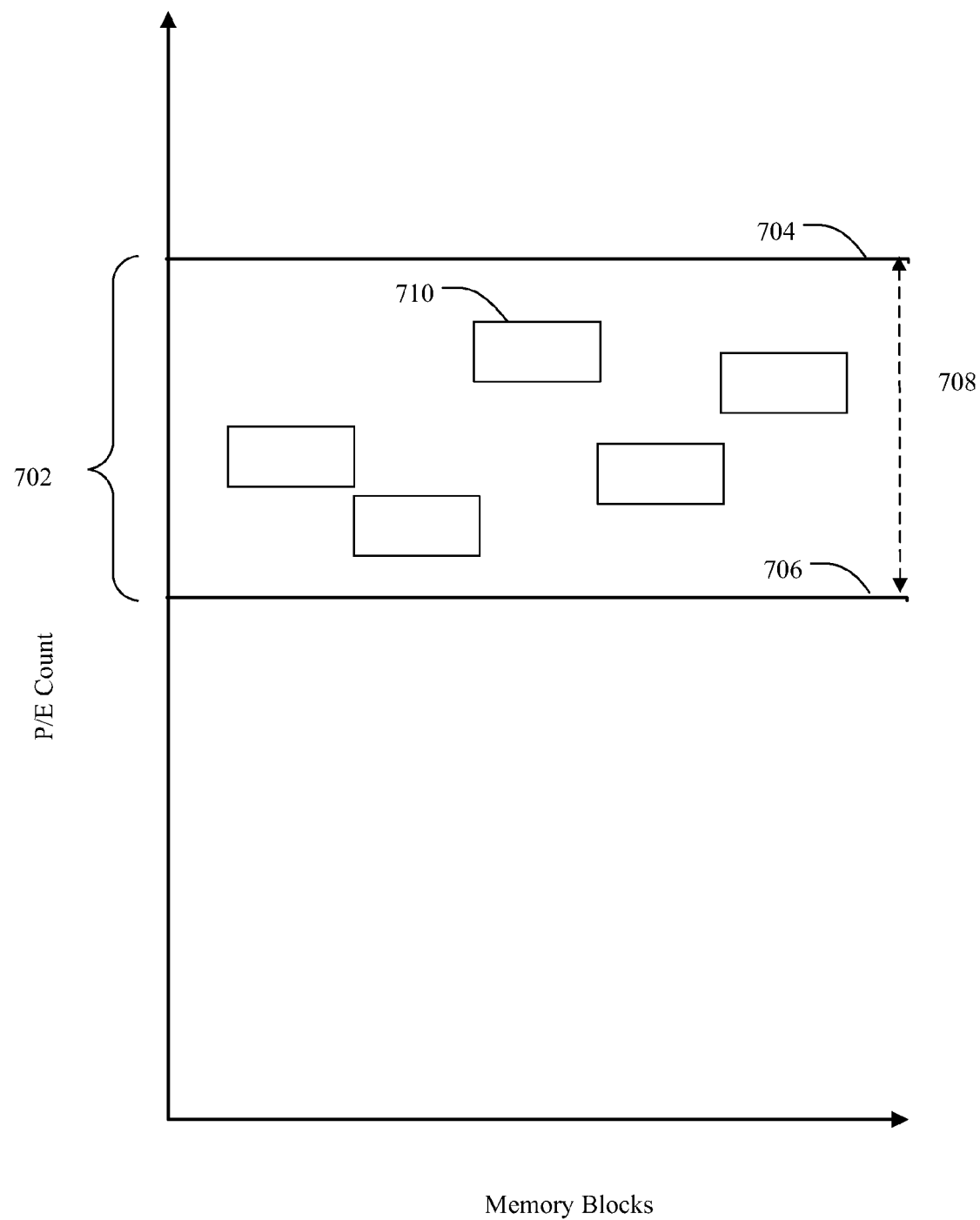
Figure 7D:
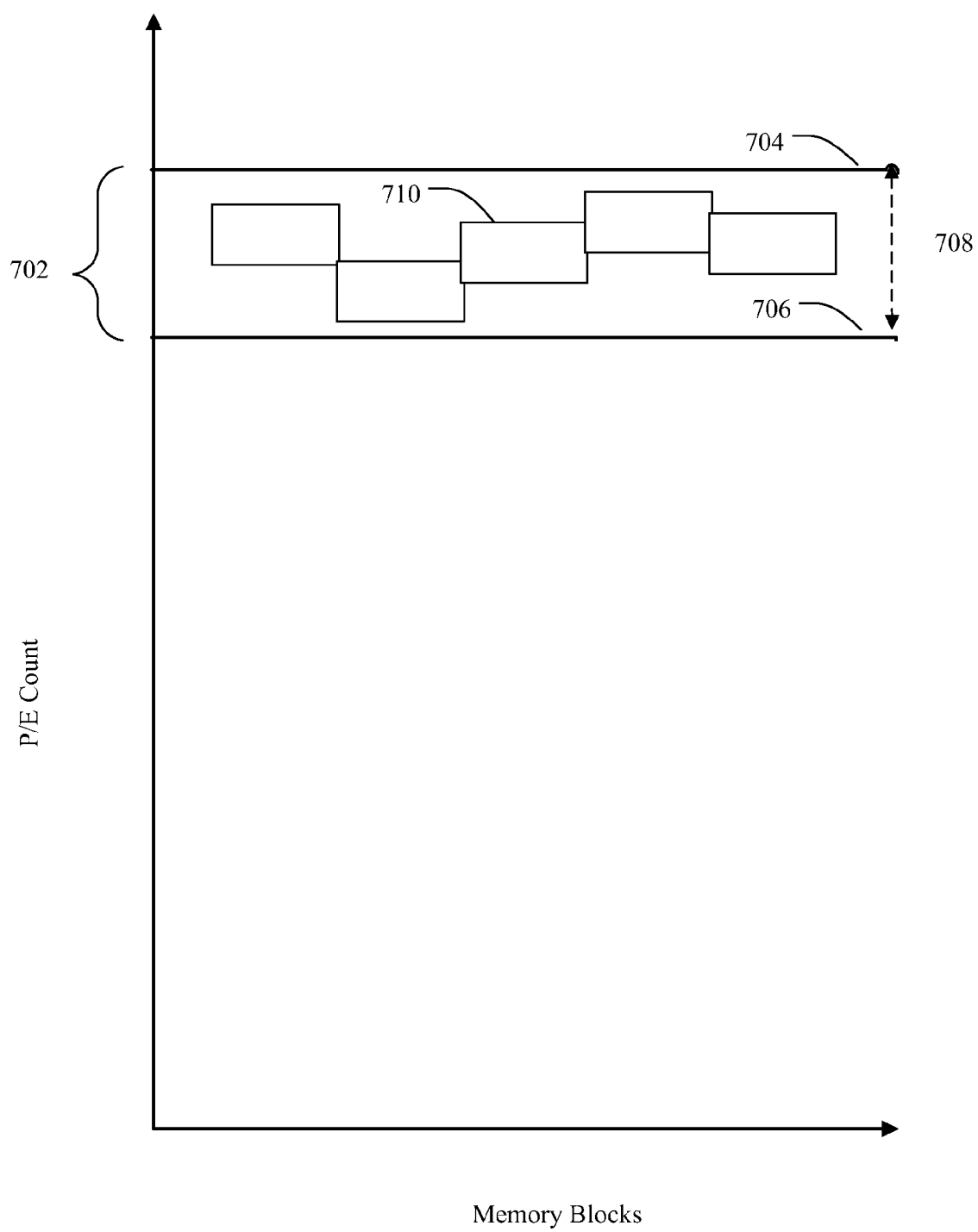

FIG. 7c illustrates a further adjustment of the wear leveling window 702 until, as shown in FIG. 7d, the wear leveling window 702 enters a closed state.

Referring again to FIG. 6, after adjusting the ceiling limit, the floor limit, or both at step 606, the memory management module may adjust a wear leveling indicator associated with a memory block at step 608. For example, when a memory block is associated with a wear leveling flag, the memory management module may set a wear leveling indicator associated with any memory block that is in an "on" position but whose P/E count is not outside the new wear leveling window to an "off" position, thereby indicating that the memory management module is not restricted from performing a wear leveling operation on the memory block.

Additionally, in implementations where the wear leveling indicator is a counter, the memory management module may decrement a value of the wear leveling counter for any memory block whose P/E count is outside of the new wear leveling window. The value of the wear leveling counter is decremented to ensure that the memory management module is not permanently prohibited from performing a wear leveling operation on the memory block. Even if the P/E count of the memory block remains outside the wear leveling window after the wear leveling window is adjusted multiple times, the wear leveling counter will eventually be decremented to zero, thereby indicating that the memory management module is not restricted from performing a wear leveling operation on the memory block.

For any memory block whose P/E count is not outside the new wear leveling window, the memory management module may set the wear leveling counter to zero, thereby indicating that the memory management module is not restricted from performing a wear leveling operation on the memory block.

In some implementations, the memory management module may also reset a wear leveling indicator associated with a memory from an "on" state to an "off" state, decrement a value of a wear leveling counter, or set a value of a wear leveling counter to zero include when a P/E count associated with a memory block is within a defined range of an average P/E count of the memory blocks of the memory system.

It will be appreciated that after adjusting the wear leveling window and the wear leveling indicator, the memory management module repeats the steps of FIG. 6 to periodically update the wear leveling window.

FIGS. 1-7d illustrate systems and methods for utilizing wear leveling windows in non-volatile memory systems. Wear leveling windows improve the performance of non-volatile memory systems in relation to conventional memory systems by reducing a number of wear leveling operations at the non-volatile memory system, thereby reducing a number of write and erase operations at the memory system that reduce an endurance and life span of the memory systems. Wear leveling windows allow a non-volatile memory system to perform wear leveling operations based on whether P/E counts of memory blocks fall outside of the wear leveling window rather than attempting to maintain a P/E count of all memory blocks in the memory system around an overall average P/E count of the memory system It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

The invention claimed is:

1. In a memory management module of a non-volatile memory system, the non-volatile memory system comprising a non-volatile memory that comprises a plurality of memory blocks, a method comprising:
   comparing a program/erase cycle count associated with a memory block of the non-volatile memory system to a wear leveling window, the wear leveling window comprising a ceiling limit and a floor limit;
   determining whether a wear leveling indicator associated with the memory block restricts performing a wear leveling operation on the memory block;
   performing a wear leveling operation on the memory block in response to determining that the program/erase cycle count associated with the memory block is within a defined range of one of the ceiling limit or the floor limit of the wear leveling window and determining that the wear leveling indicator associated with the memory block does not restrict performing a wear leveling operation on the memory block; and
   placing the memory block on a free block list after the wear leveling operation is performed on the memory block.

2. The method of claim 1, wherein at least one of the ceiling limit or the floor limit of the wear leveling window comprises a range of program/erase count values.

3. The method of claim 1, further comprising:
   adjusting at least one of the ceiling limit or the floor limit of the wear leveling window; and
   setting the wear leveling indicator associated with the memory block to not restrict performing a wear leveling operation on the memory block.

4. The method of claim 3, wherein adjusting at least one of the ceiling limit or the floor limit of the wear leveling window comprises decreasing a distance between the ceiling limit and the floor limit.

5. The method of claim 3, wherein at least one of the ceiling limit or the floor limit of the wear leveling window are adjusted based on a determination of at least one of:
   a rate at which the program/erase count associated with the memory block approaches at least one of the ceiling limit or the floor limit of the wear leveling window;
   a distance between the ceiling limit and the floor limit of the wear leveling window in relation to a spread of program/erase counts associated with memory blocks at the non-volatile memory system;
   a number of wear leveling operations since the memory management module last adjusted the wear leveling window;
   a number of memory blocks on the free block list; or
   a life stage of the non-volatile memory system.

6. The method of claim 1, wherein the wear leveling indicator comprises a flag.

7. The method of claim 1, wherein the wear leveling indicator comprises a counter.

8. The method of claim 1, wherein the wear leveling indicator is stored in at least one of a header file of the memory block or a look-up table stored at the non-volatile memory system.

9. The method of claim 1, wherein the memory block comprises a silicon substrate and a plurality of memory cells forming at least two memory layers vertically disposed with respect to each other to form a monolithic three-dimensional structure, wherein at least one layer is vertically disposed with respect to the silicon substrate.

10. A non-volatile memory system comprising:
a non-volatile memory comprising a plurality of memory units; and
processing circuitry in communication with the non-volatile memory, the processing circuitry comprising:
a memory management module configured to compare a program/erase cycle count associated with a memory unit to a ceiling limit and a floor limit; to perform a wear leveling operation on the memory unit based on the comparison of the program/erase cycle count associated with the memory unit and the ceiling limit and the floor limit; to place the memory unit on a free memory unit list after performing the wear leveling operation on the memory unit; and to adjust at least one of the ceiling limit or the floor limit.

11. The non-volatile memory system of claim 10, where the memory unit is a memory block.

12. The non-volatile memory system of claim 10, wherein at least one of the ceiling limit or the floor limit comprises a range of program/erase cycle counts.

13. The non-volatile memory system of claim 10, wherein the memory management module is configured to adjust the at least one of the ceiling limit or the floor limit based on a determination of at least one of:
a rate at which the program/erase count associated with the memory unit approaches at least one of the ceiling limit or the floor limit;
a distance between the ceiling limit and the floor limit in relation to a spread of program/erase counts associated with memory units of the plurality of memory units;
a number of wear leveling operations since the memory management module last adjusted at least one of the ceiling limit or the floor limit;
a number of memory units on the free memory unit list; or
a life stage of the non-volatile memory system.

14. The non-volatile memory system of claim 10, wherein the memory management module is further configured to store information in a header of the memory unit to restrict the memory management system from performing a wear leveling operation on the memory unit.

15. The non-volatile memory system of claim 14, wherein the information stored in the header of the memory unit comprises a counter.

16. In a memory management module of a non-volatile memory system, the non-volatile memory system comprising a non-volatile memory that comprises a plurality of memory units, a method comprising:
determining that a metric reflecting wear of a memory unit falls outside of a wear leveling window;
performing a wear leveling operation on the memory unit; and
adjusting a wear leveling indicator associated with the memory unit to restrict the memory management module from performing a future wear leveling operation on the memory unit.

17. The method of claim 16, wherein the wear leveling indictor is stored in a header file of the memory unit.

18. The method of claim 16, wherein the wear leveling indicator is stored in a look-up table stored at the non-volatile memory system.

19. The method of claim 16, wherein the wear leveling indictor comprises a flag and adjusting the wear leveling indicator comprises setting a state of the flag of the wear leveling indicator.

20. The method of claim 16, wherein the wear leveling indictor comprises a counter and adjusting the wear leveling indicator comprises setting a value of the counter of the wear leveling indicator to its maximum value.

21. The method of claim 16, wherein the metric reflecting wear of the memory block comprises a program/erase cycle count of the memory unit.

22. The method of claim 16, wherein the metric reflecting wear of the memory unit comprises an age of the memory unit.

23. The method of claim 16, wherein the metric reflecting wear of the memory unit comprises an indicator of a relative wear of the memory unit in relation to another memory unit.

* * * * *